(12) United States Patent
Kim et al.

(10) Patent No.: US 12,381,233 B2
(45) Date of Patent: Aug. 5, 2025

(54) SEPARATOR FOR FUEL CELL AND FUEL CELL STACK

(71) Applicants: HYUNDAI MOTOR COMPANY, Seoul (KR); KIA CORPORATION, Seoul (KR)

(72) Inventors: Ah Reum Kim, Yongin-si (KR); Hyun Kyu Choi, Yongin-si (KR); Hyun Jeong Kim, Yongin-si (KR); Zuh Youn Vahc, Yongin-si (KR); Bae Jung Kim, Yongin-si (KR); Sun Hwi Kim, Yongin-si (KR); Chan Gi Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 384 days.

(21) Appl. No.: 17/398,521

(22) Filed: Aug. 10, 2021

(65) Prior Publication Data
US 2022/0336826 A1 Oct. 20, 2022

(30) Foreign Application Priority Data
Apr. 16, 2021 (KR) .................... 10-2021-0049858

(51) Int. Cl.
*H01M 8/00* (2016.01)
*H01M 8/0247* (2016.01)
(Continued)

(52) U.S. Cl.
CPC ....... *H01M 8/0258* (2013.01); *H01M 8/0247* (2013.01); *H01M 8/026* (2013.01); *H01M 8/0267* (2013.01); *H01M 8/1004* (2013.01)

(58) Field of Classification Search
CPC ............ H01M 8/0267; H01M 8/0258; H01M 8/0247; H01M 8/026; H01M 8/1004;
(Continued)

(56) References Cited

U.S. PATENT DOCUMENTS 6,472,094 B1 * 10/2002 Nonoyama ......... H01M 8/0206
    429/492
7,442,463 B2 * 10/2008 Homma ................ H01M 8/243
    429/456
(Continued)

FOREIGN PATENT DOCUMENTS

CN     105594038 A    5/2016
CN     111048801 A    4/2020
(Continued)

OTHER PUBLICATIONS

Extended European Search Report issued in corresponding European Patent Application No. 21190045.1 dated Jan. 25, 2022.
(Continued)

*Primary Examiner* — Nicholas P D'Aniello
(74) *Attorney, Agent, or Firm* — MORGAN, LEWIS & BOCKIUS LLP

(57) ABSTRACT

A separator for a fuel cell, which is stacked on a reaction layer including a membrane electrode assembly (MEA) and a gas diffusion layer (GDL) includes: a plate body stacked on the GDL; stepped portions, on which a reactant gas flows in a first direction, disposed on a first surface of the plate body, the stepped portions disposed in a second direction that intersects the first direction; lands disposed on the stepped portions so as to be spaced apart from one another in the second direction, the lands being in contact with the GDL; first channels defined between the GDL and the stepped portions so as to be disposed between adjacent lands, the reactant gas flowing along the first channels; and second channels defined between the plate body and the (Continued)

GDL so as to communicate with the first channels, the reactant gas flowing along the second channels.

13 Claims, 9 Drawing Sheets

(51) Int. Cl.
*H01M 8/0258* (2016.01)
*H01M 8/026* (2016.01)
*H01M 8/0267* (2016.01)
*H01M 8/1004* (2016.01)

(58) Field of Classification Search
CPC .. H01M 8/241; H01M 8/2457; H01M 8/0254; H01M 8/023; Y02E 60/50
See application file for complete search history.

(56) References Cited

U.S. PATENT DOCUMENTS

| | | | |
|---|---|---|---|
| 9,853,300 B2 * | 12/2017 | Jeong | ............... H01M 8/0267 |
| 10,153,498 B2 | 12/2018 | Konno | |
| 2004/0081873 A1 | 4/2004 | Iwai et al. | |
| 2015/0236358 A1 * | 8/2015 | Hirata | ................. H01M 8/0263 |
| | | | 429/529 |
| 2016/0233522 A1 | 8/2016 | Konno | |
| 2016/0248104 A1 * | 8/2016 | Konno | ................ H01M 8/0263 |
| 2017/0279132 A1 | 9/2017 | Poirot-Crouvezier | |
| 2022/0255090 A1 * | 8/2022 | Shinozaki | ............... H01M 8/24 |
| 2022/0407087 A1 * | 12/2022 | Shinozaki | ........... H01M 8/0247 |

FOREIGN PATENT DOCUMENTS

| | | |
|---|---|---|
| DE | 10 2005 002 924 A1 | 7/2006 |
| JP | H07-161365 A | 6/1995 |
| JP | 2006-054198 A | 2/2006 |
| KR | 10-2016-0050055 A | 5/2016 |
| KR | 10-2017-0070575 A | 6/2017 |
| KR | 101755937 B1 * | 6/2017 |
| KR | 20200029797 A * | 3/2020 |

OTHER PUBLICATIONS

Office Action issued in corresponding Korean Patent Application No. 10-2021-0049858 dated Feb. 15, 2023, with English translation.
Office Action issued in corresponding Chinese Application No. 2021110075822 issued on Feb. 14, 2025, with English translation.

* cited by examiner

SEPARATOR FOR FUEL CELL AND FUEL CELL STACK

CROSS-REFERENCE TO RELATED APPLICATION

This application claims priority to and the benefit of Korean Patent Application No. 10-2021-0049858 filed in the Korean Intellectual Property Office on Apr. 16, 2021, the entire contents of which are incorporated herein by reference.

TECHNICAL FIELD

The present disclosure relates to a separator for a fuel cell and a fuel cell stack, and more particularly, to a fuel cell with improved performance and operational efficiency.

BACKGROUND

A fuel cell stack refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may include a membrane electrode assembly (MEA) having an electrolyte membrane that may allow hydrogen positive ions to move therethrough, and electrodes (catalyst electrode layers) provided on two opposite surfaces of the electrolyte membrane to enable a reaction between hydrogen and oxygen. The fuel cell may also include gas diffusion layers (GDLs) disposed to be in close contact with two opposite surfaces of the membrane electrode assembly and configured to uniformly distribute reactant gases and transfer the generated electrical energy, and separators (bipolar plates) disposed to be in close contact with the gas diffusion layers and configured to define flow paths.

The separators may include an anode separator for supplying hydrogen which is fuel, and a cathode separator for supplying air which is an oxidant. The separator includes channels through which the fuel or the oxidant flows, and lands which are in contact with the gas diffusion layers and serve as electrical passageways.

Meanwhile, in order to maximize the performance of the fuel cell stack, it is necessary to increase reaction areas of the reactant gases supplied to the gas diffusion layer and improve efficiency in delivering the reactant gases.

In the related art, in order to maximize the performance of the fuel cell stack, there has been proposed a method of uniformly distributing a surface pressure of the membrane electrode assembly by providing a porous member, such as metal foam or wire mesh, on the separator (e.g., cathode separator) in order to improve the performance of diffusing reactant gases and discharging produced water.

However, in the related art, the separate porous member needs to be disposed between the gas diffusion layer and the separator, which complicates a structure and a process of manufacturing the separator and causes an increase in manufacturing costs.

In the related art, it is difficult to ensure a sufficient contact area between the gas diffusion layer and the separator due to the porous member disposed between the gas diffusion layer and the separator, which causes an increase in electrical resistance and a resultant decrease in an output of the fuel cell stack. Further, the gas diffusion layer may be deformed and damaged, at the time of fastening the fuel cell stack, due to stress concentration caused by the porous member (i.e., the concentration of stress caused by an irregular cross-sectional shape of the porous member).

Therefore, recently, various studies have been conducted to simplify a structure of the separator while ensuring the reaction areas of the reactant gases and the efficiency in delivering the reactant gas, but the study results are still insufficient. Accordingly, there is a need to develop a technology for simplifying the structure of the separator while ensuring the reaction areas of the reactant gases and the efficiency in delivering the reactant gas.

SUMMARY

The present disclosure has been made in an effort to a separator for a fuel cell and a fuel cell stack, which are capable of improving performance and operational efficiency.

The present disclosure has also been made in an effort to ensure a reaction area of a reactant gas supplied to a gas diffusion layer and improve efficiency in delivering the reactant gas without providing a porous member.

The present disclosure has also been made in an effort to ensure a flow of a reactant gas in a thickness direction of a separator (a direction from the separator toward a gas diffusion layer) while ensuring the flow of the reactant gas in planar directions of the separator (in a first direction and a second direction) that intersect each other.

The present disclosure has also been made in an effort to simplify a structure and a process of manufacturing a separator and reduce manufacturing costs.

The present disclosure has also been made in an effort to reduce contact resistance (electrical resistance) between a gas diffusion layer and a separator and improve an output of a fuel cell stack.

The present disclosure has also been made in an effort to minimize deformation of and damage to a gas diffusion layer and improve durability.

The present disclosure has also been made in an effort to improve stability and reliability.

The objects to be achieved by the embodiment are not limited to the above-mentioned objects, but also include objects or effects that may be understood from the solutions or the embodiments described below.

In one aspect, the present disclosure provides a separator for a fuel cell, which is stacked on a reaction layer including a membrane electrode assembly (MEA) and a gas diffusion layer (GDL) stacked on the MEA, the separator including: a plate body stacked on the GDL; stepped portions, on which a reactant gas flows in a first direction, disposed on a first surface of the plate body, the first surface facing the GDL, the stepped portions disposed in a second direction that intersects the first direction in which the reactant gas flows; lands disposed on the stepped portions so as to be spaced apart from one another in the second direction, the lands being in contact with the GDL; first channels, along which the reactant gas flows, extending through between the GDL and the stepped portions so as to be disposed between adjacent lands among the lands; and second channels, along which the reactant gas flows, extending through between the plate body and the GDL so as to communicate with the first channels.

This is to improve performance and operational efficiency of the fuel cell.

That is, in order to maximize the performance of the fuel cell stack, it is necessary to increase reaction areas of the reactant gases supplied to the GDL and improve efficiency in delivering the reactant gases.

However, in the related art, the separate porous member needs to be disposed between the GDL and the separator, which complicates a structure and a process of manufacturing process of the separator and increases manufacturing costs.

In the related art, it is difficult to ensure a sufficient contact area between the GDL and the separator due to the porous member disposed between the GDL and the separator, which cause an increase in electrical resistance and a resultant decrease in an output of the fuel cell stack. Further, the GDL may be deformed and damaged, at the time of fastening the fuel cell stack, due to stress concentration caused by the porous member (i.e., the concentration of stress caused by an irregular cross-sectional shape of the porous member).

In contrast, in the embodiment of the present disclosure, the stepped portions may be provided in the second direction that intersects the first direction in which the reactant gas flows, and the reactant gas may flow along the first channels defined between the GDL and the stepped portions and disposed between the lands. As a result, it is possible to obtain an advantageous effect of ensuring a reaction area of the reactant gas supplied to the GDL and improving efficiency in delivering the reactant gas without additionally providing a porous member.

Among other things, in the embodiment of the present disclosure, as the reactant gas flows over the stepped portion, a flow of the reactant gas may be defined in a thickness direction of the separator (the direction from the separator toward the GDL). As a result, it is possible to obtain an advantageous effect of further improving the performance of delivering the substance (the performance of delivering the reactant gas) to the GDL.

In addition, in the embodiment of the present disclosure, since a porous member is excluded and the separator is in direct contact with the GDL, it is possible to reduce contact resistance (electrical resistance) between the GDL and the separator and minimize stress concentration. As a result, it is possible to obtain an advantageous effect of minimizing deformation of and damage to the GDL at the time of fastening the fuel cell stack and improving durability.

Moreover, in the embodiment of the present disclosure, since the porous member may be excluded, a welding process of coupling the porous member to the separator may be excluded. As a result, it is possible to obtain an advantageous effect of simplifying the structure of the separator and the process of manufacturing the separator.

The stepped portion may be provided in various ways in accordance with required conditions and design specifications. In particular, the stepped portion may be provided as a relief on one surface of the plate body by partially processing a part of the plate body.

The land may be provided in various ways in accordance with required conditions and design specifications. In particular, the land may be provided as a relief on one surface of the stepped portion by partially processing a part of the plate body.

Since the land is provided by partially processing a part of the plate body as described above, it is possible to obtain an advantageous effect of reducing costs and simplifying the manufacturing process of providing the land.

According to the exemplary embodiment of the present disclosure, the land may have a polygonal cross-sectional shape or a circular cross-sectional shape.

According to the exemplary embodiment of the present disclosure, the lands may be disposed in the form of a lattice.

Since the plurality of lands is disposed in the form of a regular lattice as described above, it is possible to minimize the concentration of stress on a particular site of the GDL at the time of fastening the fuel cell stack. As a result, it is possible to obtain an advantageous effect of minimizing deformation of and damage to the GDL caused by the stress concentration.

According to the exemplary embodiment of the present disclosure, the lands may be disposed in different lines in the first direction.

According to the exemplary embodiment of the present disclosure, the first direction and the second direction may be defined to be perpendicular (orthogonal) to each other.

According to the exemplary embodiment of the present disclosure, the second channel may be continuously provided in the second direction.

In particular, the stepped portions and the second channels may be disposed alternately in the first direction.

According to the exemplary embodiment of the present disclosure, the separator for a fuel cell may include cooling channels provided on the other surface of the plate body and configured such that a coolant flows along the cooling channels.

The cooling channel may have various structures in accordance with required conditions and design specifications. In particular, the cooling channel may be continuously defined along the internal space in the stepped portion.

Since the stepped portions and the cooling channels are provided on the plate body as described above, it is possible to obtain an advantageous effect of simplifying the structure of the separator and the process of manufacturing the separator.

According to the exemplary embodiment of the present disclosure, at least two plate bodies may be provided to be in close contact with each other, and the cooling channels provided on the plate bodies, respectively, may communicate with each other to define a common cooling channel.

Since the two cooling channels communicate with each other as described above, the straight common cooling channel having a further expanded cross-sectional area is provided, such that the flowability of the coolant may be improved. As a result, it is possible to obtain an advantageous effect of maximizing cooling performance and cooling efficiency implemented by the coolant.

According to the exemplary embodiment of the present disclosure, the separator for a fuel cell may include an inclined guide portion provided on the land and configured to guide the reactant gas toward the GDL.

Since the inclined guide portion is disposed on the land as described above, a movement direction of the reactant gas moving toward the sidewall of the land may change to the thickness direction of the separator (the direction from the separator toward the GDL) along the inclined guide portion. Therefore, the inclined guide portion may impart a velocity component to the reactant gas moving toward the GDL and induce the movement of the reactant gas toward the GDL. As a result, it is possible to obtain an advantageous effect of further improving efficiency in delivering the reactant gas to the GDL.

According to the exemplary embodiment of the present disclosure, the separator for a fuel cell may include a round portion provided at a boundary between the inclined guide portion and a land surface of the land.

Since the round portion is provided at the boundary between the land surface and the inclined guide portion as described above, the reactant gas guided to the GDL along the inclined guide portion may flow more smoothly and gently. As a result, it is possible to minimize a repulsive force caused by the inclined guide portion and further improve efficiency in delivering the reactant gas to the GDL.

Moreover, since the round portion is provided at the boundary between the land surface and the inclined guide portion, it is possible to inhibit stress from being concentrated on an edge region of the land surface at the time of fastening the fuel cell stack. As a result, it is possible to obtain an advantageous effect of minimizing deformation of and damage to the GDL caused by the stress concentration.

In another aspect, the present disclosure provides a fuel cell stack including: a reaction layer including a membrane electrode assembly (MEA) and a gas diffusion layer (GDL) stacked on the membrane electrode assembly; a plate body stacked on the GDL; stepped portions, on which a reactant gas flows in a first direction, disposed on a first surface of the plate body, the first surface facing the GDL, the stepped portions disposed in a second direction that intersects the first direction in which the reactant gas flows; lands disposed on the stepped portions so as to be spaced apart from one another in the second direction, the lands being in contact with the GDL; first channels, along which the reactant gas flows, extending through between the GDL and the stepped portions so as to be disposed between adjacent lands among the lands; and second channels, along which the reactant gas flows, extending through between the plate body and the GDL so as to communicate with the first channels.

According to the embodiment of the present disclosure as described above, it is possible to obtain an advantageous effect of improving performance and operational efficiency.

In particular, according to the embodiment of the present disclosure, it is possible to obtain an advantageous effect of ensuring the reaction area of the reactant gas supplied to the GDL and improving efficiency in delivering the reactant gas without providing a porous member.

Among other things, according to the embodiment of the present disclosure, it is possible to obtain an advantageous effect of ensuring the flow of the reactant gas in the thickness direction of the separator (the direction from the separator toward the GDL) while ensuring the flows of the reactant gas in planar directions of the separator (in the first direction and the second direction) that intersect each other. Further, it is possible to obtain an advantageous effect of further improving the performance of delivering the substance (the performance of delivering the reactant gas) to the GDL.

In addition, according to the embodiment of the present disclosure, it is possible to obtain an advantageous effect of reducing contact resistance (electrical resistance) between the GDL and the separator and improve the output of the fuel cell stack.

In addition, according to the embodiment of the present disclosure, it is possible to obtain an advantageous effect of simplifying the structure and the manufacturing process and reducing the manufacturing costs.

In addition, according to the exemplary embodiment of the present disclosure, it is possible to obtain an advantageous effect of minimizing deformation of and damage to the GDL and improving durability.

In addition, according to the embodiment of the present disclosure, it is possible to obtain an advantageous effect of improving stability and reliability.

DETAILED DESCRIPTION

Figure 1:
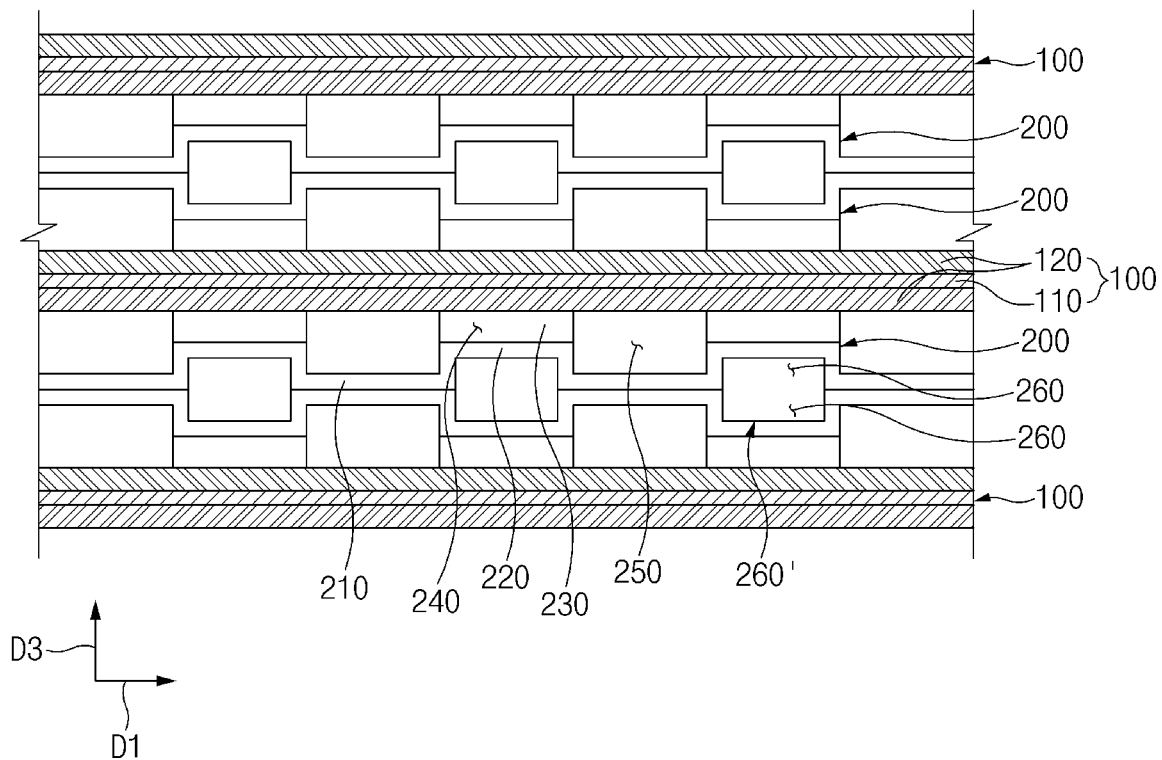
FIG. 1 is a view for explaining a fuel cell stack according to an embodiment of the present disclosure.
Figure 2:
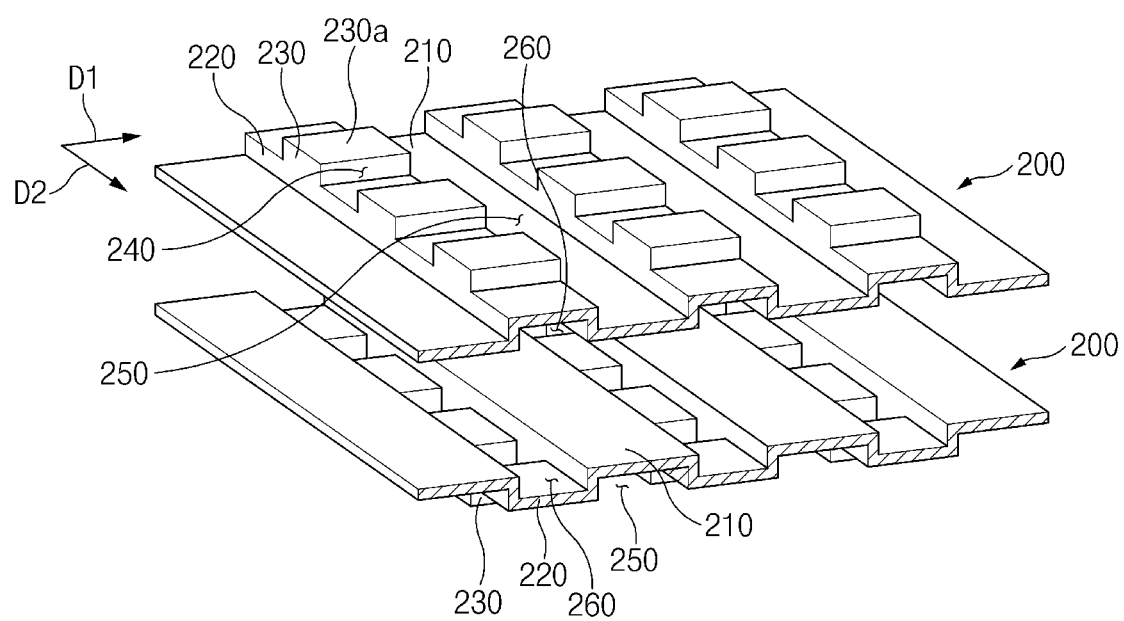
FIGS. 2 and 3 are views for explaining a separator for a fuel cell according to the embodiment of the present disclosure.
Figure 3:
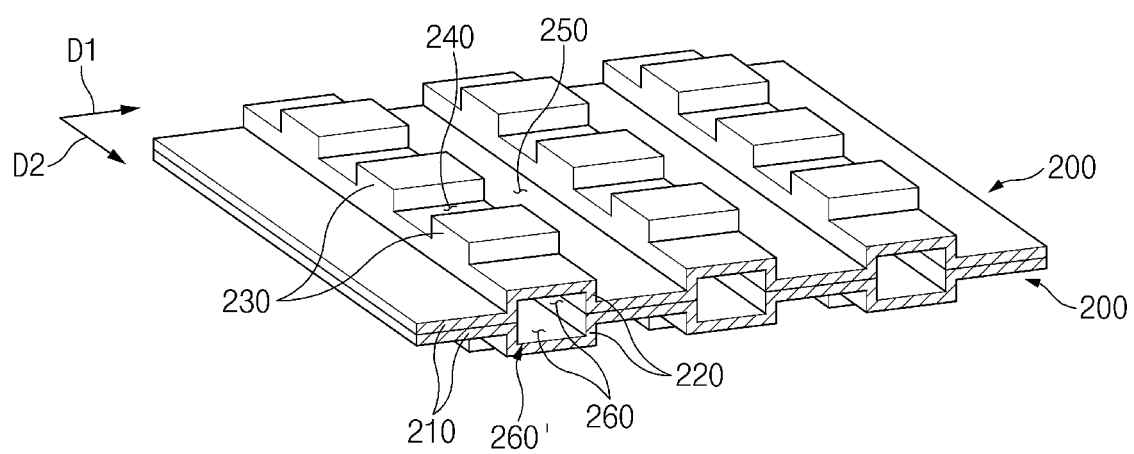
Figure 4:
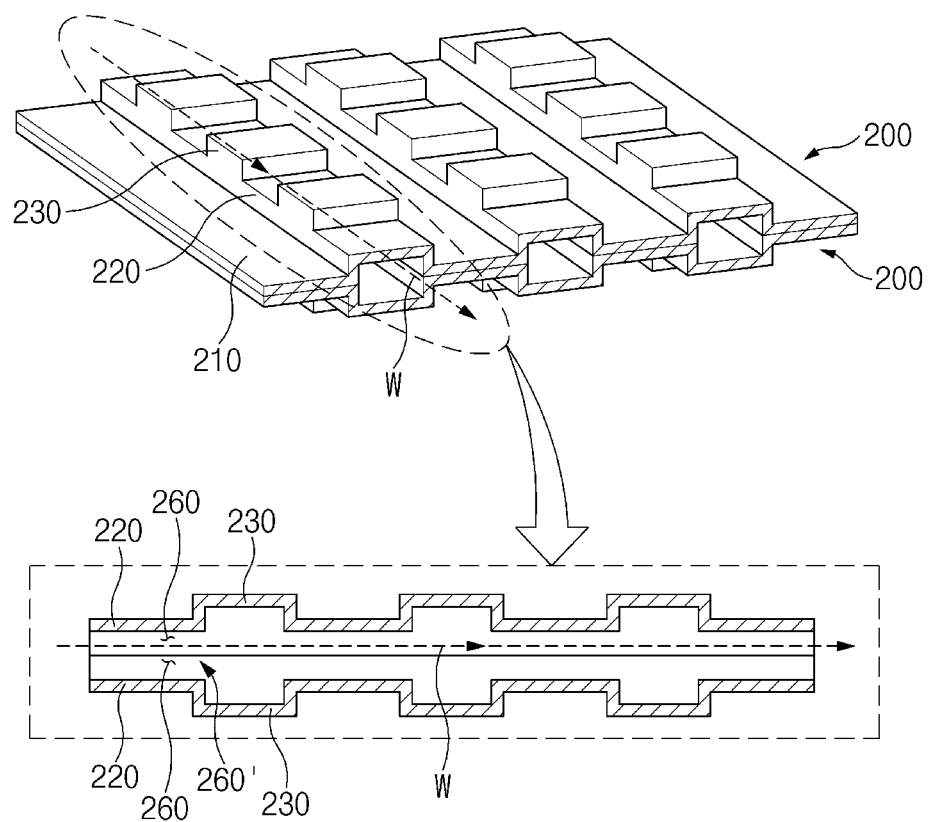
FIG. 4 is a view for explaining a cooling channel of the separator for a fuel cell according to the embodiment of the present disclosure.
Figure 5:
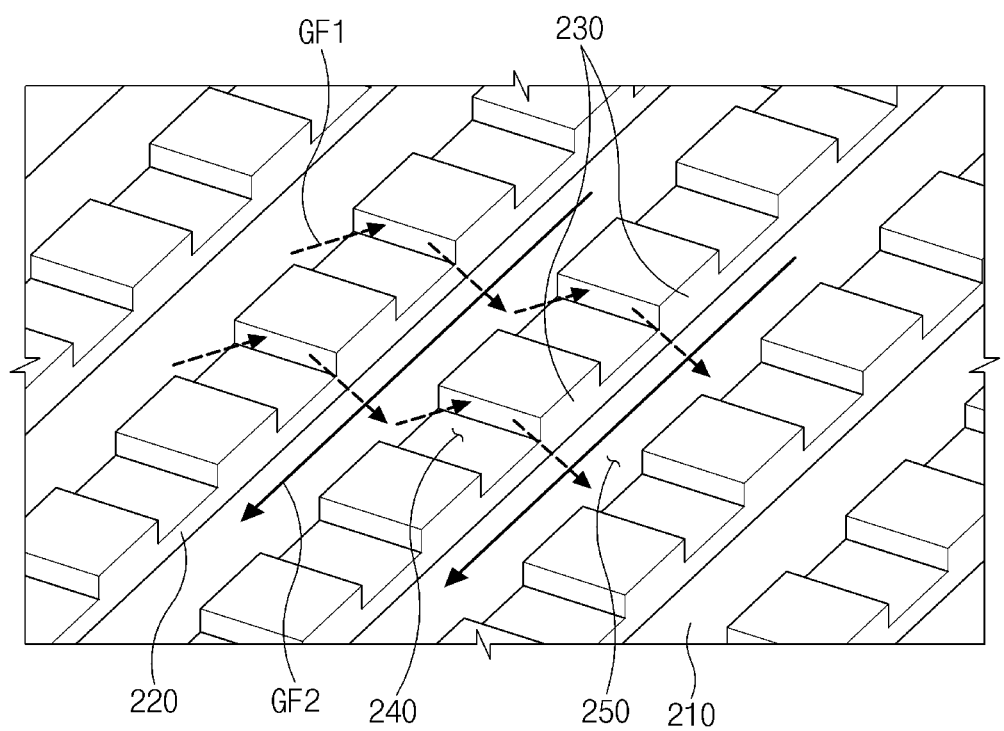
FIG. 5 is a view for explaining a flow of a reactant gas in the separator for a fuel cell according to the embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiment of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is formed or disposed above (on) or below (under) another constituent element" includes not only a case in which the two constituent elements are in direct contact with each other, but also a case in which one or more other constituent elements are formed or disposed between the two constituent elements. The expression "above (on) or below (under)" may include a meaning of a downward direction as well as an upward direction based on one constituent element.

Referring to FIGS. 1 to 9, a fuel cell stack 10 according to the embodiment of the present disclosure includes: a reaction layer 100 including a membrane electrode assembly (MEA) 110 and gas diffusion layers (GDLs) 120 stacked on the membrane electrode assembly 110; plate bodies 210 stacked on the GDLs 120; stepped portions 220 provided on one surface of each of the plate bodies 210 facing the GDL 120 and disposed in a second direction D2 that intersects a first direction D1 in which a reactant gas is supplied; lands 230 provided on the stepped portions 220 so as to be spaced apart from one another in the second direction D2 and disposed in contact with each of the GDLs 120; first channels 240 defined between each of the GDLs 120 and the stepped portions 220 so as to be disposed between the adjacent lands 230 and configured to allow the reactant gas to flow therethrough; and second channels 250 defined between the plate bodies 210 and each of the GDLs 120 so as to communicate with the first channels 240 and configured to allow the reactant gas to flow therethrough.

For reference, the fuel cell stack 10 may be configured by stacking a plurality of unit cells in a reference direction (an upward/downward direction based on FIG. 1).

The fuel cell (unit cell) may include the reaction layer 100, and separators 200 stacked on two opposite sides of the reaction layer 100. The fuel cell stack 10 may be configured by stacking the plurality of fuel cells in the reference direction and then assembling end plates (not illustrated) with the two opposite ends of the plurality of fuel cells.

More specifically, the reaction layer 100 includes the membrane electrode assembly (MEA) 110 configured such that catalyst electrode layers, in which an electrochemical reaction occurs, are attached to two opposite sides of an electrolyte membrane in which hydrogen ions move. The reaction layer 100 further includes the gas diffusion layers (GDL) 120 being in close contact with two opposite sides of the membrane electrode assembly 110 and configured to uniformly distribute the reactant gases and transfer produced electrical energy.

The membrane electrode assembly 110 serves to generate electricity by means of an oxidation-reduction reaction between fuel (e.g., hydrogen), which is a first reactant gas, and an oxidant (e.g., air) which is a second reactant gas.

A structure and a material of the membrane electrode assembly 110 may be variously changed in accordance with required conditions and design specifications, and the present disclosure is not limited or restricted by the structure and the material of the membrane electrode assembly 110.

For example, the membrane electrode assembly 110 includes the electrolyte membrane through which hydrogen ions move, and the catalyst electrode layers attached to two opposite surfaces of the electrolyte membrane, and the electrochemical reactions occur in the catalyst electrode layers.

The gas diffusion layers (GDLs) 120 are stacked on the two opposite sides of the membrane electrode assembly 110 and serve to uniformly distribute the reactant gases and transfer the produced electrical energy.

The GDL 120 may have various structures capable of diffusing the reactant gas. For example, the GDL 120 may have a porous structure having pores each having a predetermined size.

The sizes of the pores and the material of the GDL 120 may be variously changed in accordance with required conditions and design specifications, and the present disclosure is not limited or restricted by the sizes of the pores and the material of the GDL 120.

The separators 200 are provided to serve not only to block (separate) hydrogen and air, which are the reactant gases, but also to ensure flow paths of the reactant gases and transmit electric current to an external circuit.

In addition, the separators 200 may also serve to distribute heat, which is generated in the fuel cell (unit cell), to the entire fuel cell, and the excessively generated heat may be discharged to the outside by a coolant flowing along the cooling channels 260 between the separators 200.

In the embodiment of the present disclosure, the separators 200 may be defined as including both an anode separator 200 configured to define flow paths for hydrogen which is fuel, and a cathode separator 200 configured to define flow paths for air which is an oxidant.

For example, the separator 200 may be made of a thin film metal material (e.g., stainless steel, Inconel, or aluminum). The separators 200 (the anode separator and the cathode separator), together with the reaction layer 100, may constitute a single fuel cell (unit cell) and independently define the flow paths of the hydrogen, the air, and the coolant. According to another embodiment of the present disclosure, the separator may be made of another material such as graphite or a carbon composite.

For reference, hydrogen, which is the fuel, and air, which is the oxidant, are supplied to an anode (not illustrated) and a cathode (not illustrated) of the membrane electrode assembly 110, respectively, through the channels 240 and 250 in the separators 200 (the cathode separator and the anode separator). The hydrogen may be supplied to the anode, and the air may be supplied to the cathode.

The hydrogen supplied to the anode is separated into hydrogen ions (protons) and electrons by catalysts in the electrode layers provided on the two opposite sides of the electrolyte membrane. Only the hydrogen ions are selectively transmitted to the cathode through the electrolyte membrane, which is a cation exchange membrane, and at the same time, the electrons are transmitted to the cathode through the GDL 120 and the separator 200 which are conductors.

At the cathode, the hydrogen ions supplied through the electrolyte membrane and the electrons transmitted through the separator 200 meet oxygen in the air supplied to the cathode by an air supply device, thereby creating a reaction of producing water. As a result of the movement of the hydrogen ions, the electrons flow through external conductive wires, and the electric current is produced as a result of the flow of the electrons.

For example, referring to FIG. 1, the separator 200 (e.g., the anode separator) for supplying hydrogen may be disposed on an upper surface of the membrane electrode assembly 110, and the separator 200 (e.g., the cathode separator) for supplying air may be disposed on a lower surface of the membrane electrode assembly 110.

More specifically, the separator 200 includes: the plate body 210 stacked on one surface of each of the GDLs 120 stacked on the membrane electrode assembly 110; the stepped portions 220 provided on one surface of the plate body 210 facing the GDL 120 and disposed in the second direction D2 that intersects the first direction D1 in which the reactant gas is supplied; the lands 230 provided on the stepped portions 220 so as to be spaced apart from one another in the second direction D2 and disposed in contact with each of the GDLs 120; the first channels 240 defined between each of the GDLs 120 and the stepped portions 220 so as to be disposed between the adjacent lands 230 and configured to allow the reactant gas to flow therethrough; and the second channels 250 defined between the plate body 210 and each of the GDLs 120 so as to communicate with the first channels 240 and configured to allow the reactant gas to flow therethrough.

Referring to FIGS. 1 to 5, the plate body 210 may be provided in the form of a flat, thin film plate, and the present disclosure is not limited or restricted by the size, the material, and the structure of the plate body 210.

For example, the plate body 210 may be provided in the form of a flat quadrangular plate and made of a typical metal material (e.g., stainless steel, Inconel, or aluminum).

The stepped portions 220 protrude from one surface of the plate body 210 that faces the GDL 120 and are disposed in the second direction D2 that intersects the first direction D1 (e.g., in a leftward/rightward direction based on FIG. 1) in which the reactant gas is supplied.

For reference, in the embodiment of the present disclosure, the first direction D1 may be defined as the direction in which the reactant gas is supplied from one end of the separator 200 toward the inside of the separator 200 (or the other end of the separator 200).

In addition, the second direction D2 may be defined as various directions that intersect the first direction D1 on the same plane. In particular, the first direction D1 and the second direction D2 may be defined to be perpendicular (orthogonal) to each other.

A height of the stepped portion 220 (a height in a thickness direction of the separator) and a width of the stepped portion 220 (a width in the first direction) may be variously changed in accordance with required conditions and design specifications, and the present disclosure is not limited or restricted by the height and the width of the stepped portion 220.

For reference, as the height of the stepped portion 220 increases, a concentration of the reactant gas, which acts on the GDL 120 while flowing over the stepped portion 220, may increase. For example, when the height of the stepped portion 220 increases by 0.1 mm, the concentration of the reactant gas acting on the GDL 120 may increase by about 65%.

In particular, the stepped portion 220 may be provided in plural, and the plurality of stepped portions 220 may be spaced apart from one another at predetermined intervals in the first direction D1.

The stepped portion 220 may be provided in various ways in accordance with required conditions and design specifications. In particular, the stepped portion 220 may be provided integrally with the plate body 210 by partially processing (e.g., pressing) a part of the plate body 210.

More particularly, the stepped portion 220 may be provided as a relief on one surface of the plate body 210 by partially processing a part of the plate body 210. Further, the stepped portion 220 may have the same thickness as the plate body 210.

Since the stepped portion 220 is provided by partially processing a part of the plate body 210 as described above, it is possible to obtain an advantageous effect of reducing costs and simplifying a manufacturing process of providing the stepped portion 220.

According to another embodiment of the present disclosure, the stepped portion may be provided on the plate body by die casting or cutting. Alternatively, the stepped portion may be manufactured separately from the plate body and then attached or coupled to the plate body.

The lands 230 are provided on the outer surfaces of the stepped portions 220 and spaced apart from one another in the second direction D2, and land surfaces 230a of the lands 230 may be in contact with the GDL 120.

The land 230 may have various structures capable of being in contact with the GDL 120, and the present disclosure is not limited or restricted by the shape and the structure of the land 230. In addition, spacing intervals between the lands 230 and the number of lands 230 may also be variously changed in accordance with required conditions and design specifications.

For example, the land 230 may have an approximately quadrangular block shape and protrude from the outer surface of the stepped portion 220. The lands 230 may be disposed to be spaced apart from one another at predetermined intervals in the second direction D2.

A first width of the land 230 (a width in the first direction), a second width of the land 230 (a width in the second direction), and a height of the land 230 (a height in the thickness direction of the separator) may be variously changed in accordance with required conditions and design specifications, and the present disclosure is not limited or restricted by the height and the widths (the first width and the second width) of the land 230.

In particular, the plurality of lands 230 disposed on the stepped portions 220 may be disposed in the form of a regular lattice.

In this case, the configuration in which the plurality of lands 230 is disposed in the form of a regular lattice may be understood as a configuration in which the plurality of lands 230 is disposed in the same line in the first direction D1 and also disposed in the same line even in the second direction D2.

Since the plurality of lands 230 is disposed in the form of a regular lattice as described above, it is possible to minimize the concentration of stress on a particular site of the GDL 120 at the time of fastening the fuel cell stack 10. As a result, it is possible to obtain an advantageous effect of minimizing deformation of and damage to the GDL 120 caused by the stress concentration.

The land 230 may be provided in various ways in accordance with required conditions and design specifications. In particular, the land 230 may be provided integrally with the plate body 210 by partially processing (e.g., pressing) a part of the plate body 210. In particular, the stepped portion 220 and the land 230 may be provided together through a single process.

Like the stepped portion 220, the land 230 may be provided as a relief on one surface of the stepped portion 220 (a surface facing the GDL) by partially processing a part of the plate body 210. The land 230 may have the same thickness as the stepped portion 220 and the plate body 210.

Since the land 230 is provided by partially processing a part of the plate body 210, it is possible to obtain an advantageous effect of reducing costs and simplifying the manufacturing process of providing the land 230.

According to another embodiment of the present disclosure, the land may be provided on the stepped portion by die casting or cutting. Otherwise, the land may be manufactured separately from the plate body and then attached or coupled to the plate body.

The first channel 240 is defined between the GDL 120 and the stepped portion 220 and disposed between the adjacent lands 230, and the reactant gas supplied to the separator 200 may flow in the first direction D1 along the first channel 240.

As described above, in the embodiment of the present disclosure, since the reactant gas supplied to the separator 200 flows along the first channel 240, it is possible to ensure a flow of the reactant gas in the planar direction (e.g., the first direction) of the separator 200 and ensure a flow of the reactant gas in the thickness direction of the separator 200

(e.g., the direction from the separator toward the GDL, see D3 in FIG. 1) (define a three-dimensional flow of the reactant gas). As a result, it is possible to obtain an advantageous effect of improving performance of delivering the substance (performance of delivering the reactant gas) to the GDL 120.

In particular, in the embodiment of the present disclosure, as the reactant gas flows over the stepped portion 220, a flow GF1 of the reactant gas is defined in the direction from the separator 200 to the GDL 120. As a result, it is possible to obtain an advantageous effect of further improving the performance of delivering the reactant gas to the GDL 120.

The second channel 250 is defined between the plate body 210 and the GDL 120 so as to communicate with the first channel 240, and the reactant gas supplied to the separator 200 (the reactant gas passing through the first channel) may flow in the second direction D2 along the second channel 250.

In this case, the second channel 250 may be understood as a space between the stepped portions 220 disposed to be spaced apart from each other in the first direction D1.

In particular, the second channel 250 is continuously provided in the second direction D2 without interruption.

More particularly, the stepped portions 220 and the second channels 250 are disposed alternately in the first direction D1.

The reactant gas having passed through the first channel 240 may be diffused in the second direction D2 while flowing along the second channel 250, and the reactant gas flowing along the second channel 250 may flow through the plurality of first channels 240 again, such that the reactant gas may be uniformly diffused across the entire region of the separator 200.

As described above, in the embodiment of the present disclosure, since the reactant gas having passed through the first channel 240 is diffused GF2 in the second direction D2 while flowing along the second channel 250, it is possible to implement the three-dimensional flows GF1 and GF2 of the reactant gas in the planar directions (e.g., the first direction and the second direction) of the separator 200. As a result, it is possible to obtain an advantageous effect of further improving the reaction area of the reactant gas supplied to the GDL 120 and efficiency in delivering the reactant gas.

Among other things, in the embodiment of the present disclosure, since the first channel 240 and the second channel 250 are provided between the GDL 120 and the plate body 210, it is possible to ensure the flows (see GF1 and GF2 in FIG. 5) of the reactant gas in the planar directions (e.g., the first direction and the second direction) of the separator 200 and ensure the flow of the reactant gas in the thickness direction of the separator 200 (the direction from the separator 200 toward the GDL 120, see D3 in FIG. 1). Therefore, it is possible to implement the stereoscopic flow (three-dimensional flow) of the reactant gas. Therefore, it is possible to obtain an advantageous effect of improving the performance of delivering the substance (the performance of delivering the reactant gas) to the GDL 120 without a porous member.

Referring to FIGS. 1 to 4, according to the exemplary embodiment of the present disclosure, the separator 200 for a fuel cell may include the cooling channels 260 provided on the other surface of the plate body 210 and configured to allow the coolant W to flow therethrough.

The cooling channel 260 may have various structures in accordance with required conditions and design specifications, and the present disclosure is not limited or restricted by the cooling channel 260.

In particular, the cooling channel 260 is continuously defined along an internal space in the stepped portion 220 (and the land).

In this case, the configuration in which the cooling channel 260 is defined as the internal space in the stepped portion 220 may be understood as a configuration in which the cooling channel 260 is provided as a space (recessed space) provided in the stepped portion 220 when the stepped portion 220 is provided on the plate body 210.

Since the stepped portions 220 (and the lands) and the cooling channels 260 are provided on the plate body 210 as described above, it is possible to obtain an advantageous effect of simplifying the structure of the separator 200 and the process of manufacturing the separator 200.

In particular, at least two plate bodies 210 are provided to be in close contact with each other, and the cooling channels 260 provided on the plate bodies 210, respectively, communicate with one another, thereby defining a common cooling channel 260'.

That is, at least two plate bodies 210 may be in close contact with each other (the plate bodies are in close contact with each other so that the other surface of one plate body and the other surface of the other plate body face each other) so as to define different fuel cells (unit cells). The cooling channels 260 provided on the plate bodies 210, respectively, communicate with one another, thereby defining the common cooling channel 260'.

Since the two cooling channels 260 communicate with each other as described above, it is possible to provide the straight common cooling channel 260' having a further expanded cross-sectional area (e.g., twice the cross-sectional area of the cooling channel), thereby improving the flowability of the coolant. As a result, it is possible to obtain an advantageous effect of maximizing cooling performance and cooling efficiency implemented by the coolant.

Figure 6:
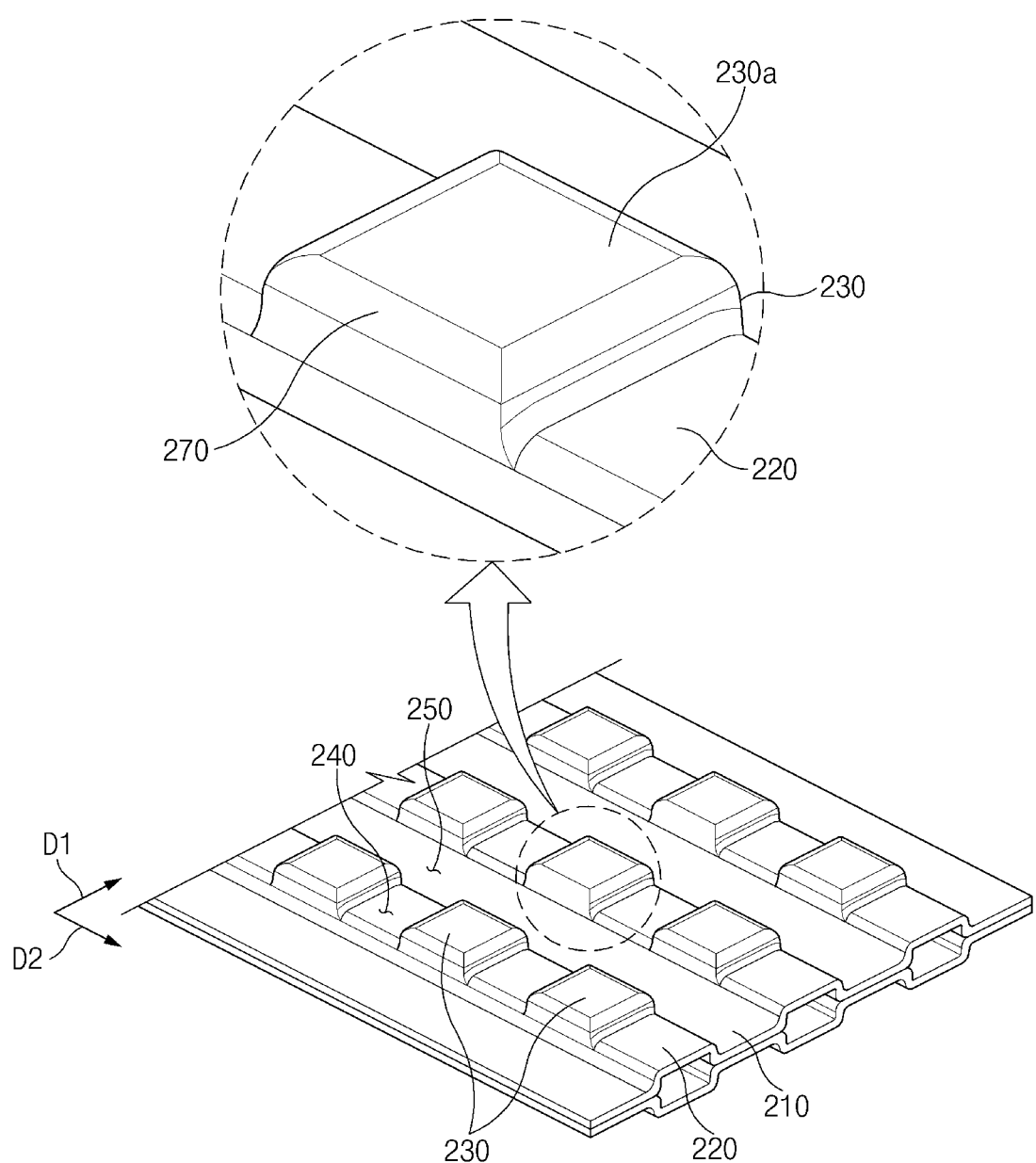
FIGS. 6 and 7 are views for explaining an inclined guide portion of the separator for a fuel cell according to the embodiment of the present disclosure.
Figure 7:
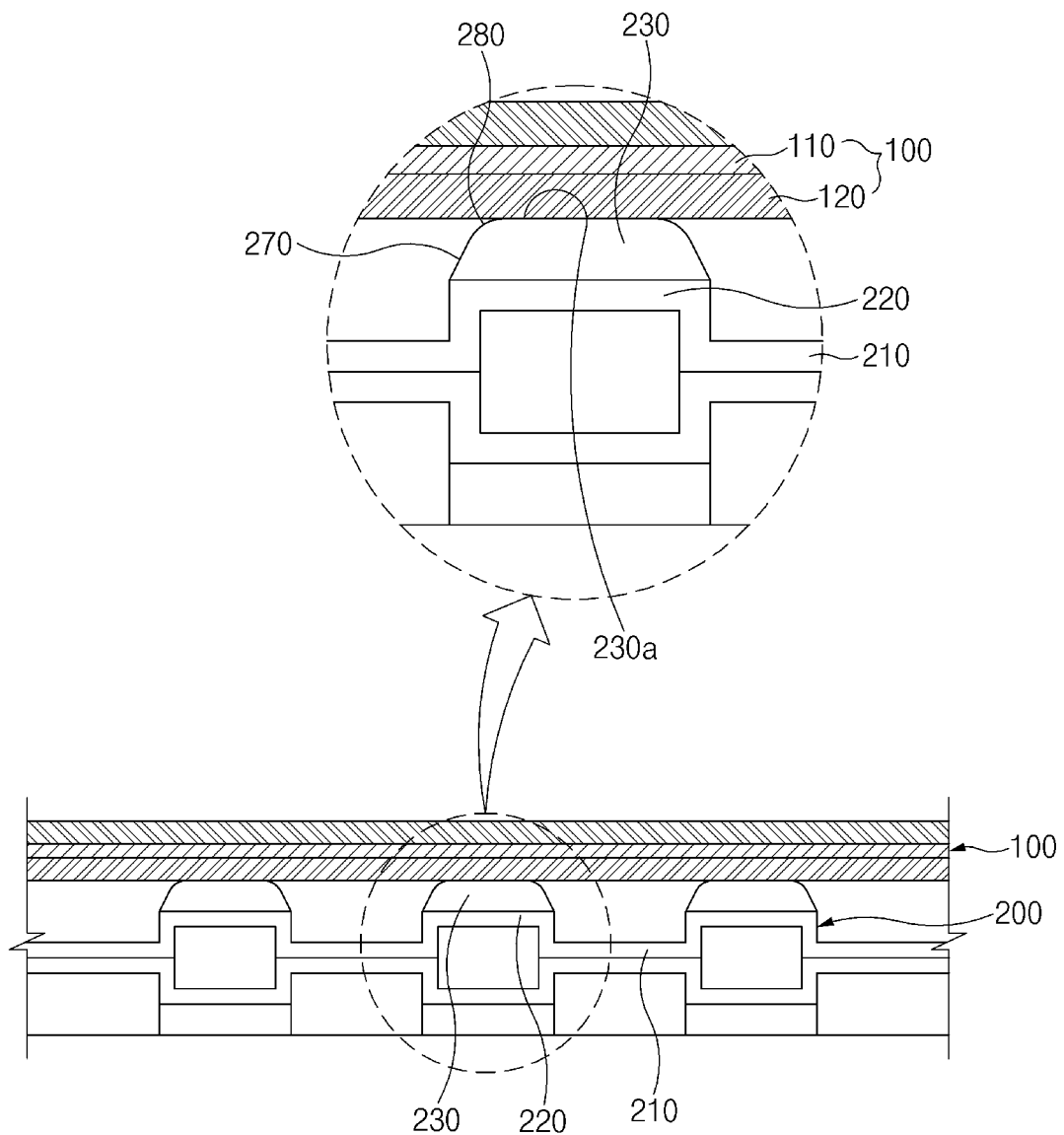

Referring to FIGS. 6 and 7, according to the exemplary embodiment of the present disclosure, the separator 200 for a fuel cell may include an inclined guide portion 270 provided on the land 230 and configured to guide the reactant gas toward the GDL 120.

For example, the inclined guide portion 270 may be disposed at an edge portion of the land surface 230a so as to define a sidewall of the land 230. In particular, the inclined guide portion 270 may be provided along the entire periphery of the land 230. According to another embodiment of the present disclosure, the inclined guide portion may be provided partially only in a partial section of the entire periphery of the land.

An inclination angle of the inclined guide portion 270 (an inclination angle with respect to the outer surface of the stepped portion) may be variously changed in accordance with required conditions and design specifications, and the present disclosure is not limited or restricted by the inclination angle of the inclined guide portion 270.

For reference, in the embodiment of the present disclosure, the example in which the inclined guide portion has a straight shape is described. However, according to another embodiment of the present disclosure, the inclined guide portion may have a curved shape (e.g., an arc shape) or a combination of the straight shape and the curved shape.

Since the inclined guide portion 270 is disposed on the land 230 as described above, a movement direction of the reactant gas moving toward the sidewall of the land 230 may change to the thickness direction of the separator 200 (the direction D3 from the separator toward the GDL) along the inclined guide portion 270. Therefore, the inclined guide portion may impart a velocity component to the reactant gas flowing toward the GDL 120 and induce the flow of the reactant gas toward the GDL 120. As a result, it is possible to obtain an advantageous effect of further improving efficiency in delivering the reactant gas to the GDL 120.

Figure 8:
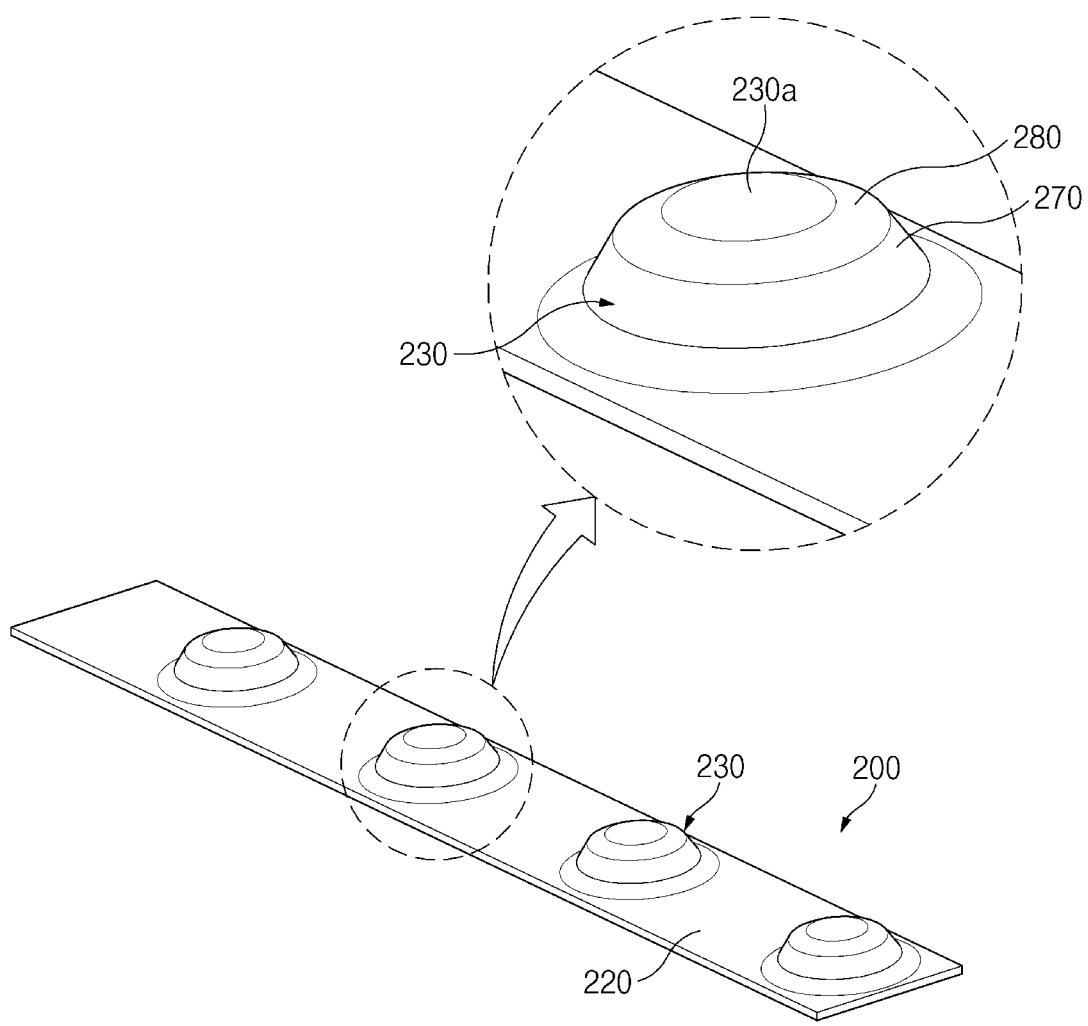
FIGS. 8 and 9 are views for explaining modified examples of lands of the separator for a fuel cell according to the embodiment of the present disclosure.

Referring to FIGS. 7 and 8, according to the exemplary embodiment of the present disclosure, the separator 200 for a fuel cell may include a round portion 280 provided at a boundary between the inclined guide portion 270 and the land surface 230a of the land 230 which is to be in contact with the GDL 120.

Since the round portion 280 is provided at the boundary between the land surface 230a and the inclined guide portion 270 as described above, the reactant gas guided to the GDL 120 along the inclined guide portion may flow more smoothly and gently. As a result, it is possible to minimize a repulsive force caused by the inclined guide portion and further improve the efficiency in delivering the reactant gas to the GDL 120.

Moreover, since the round portion 280 is provided at the boundary between the land surface 230a and the inclined guide portion 270, it is possible to inhibit stress from being concentrated on an edge region of the land surface 230a at the time of fastening the fuel cell stack 10. As a result, it is possible to obtain an advantageous effect of minimizing deformation of and damage to the GDL 120 caused by the stress concentration.

Meanwhile, in the embodiment of the present disclosure illustrated and described above, the example in which the land 230 is provided in the form of a quadrangular block having a quadrangular cross section is described. However, according to another embodiment of the present disclosure, the land may have other cross-sectional shapes.

Referring to FIG. 8, according to the exemplary embodiment of the present disclosure, the land 230 may have a circular cross-sectional shape.

In particular, the land 230 may have a cross-sectional area that gradually decreases from one end adjacent to a terminal to the other end adjacent to the GDL 120.

For example, the land 230 may have an approximately truncated conical shape (circular truncated cone shape) having a circular cross section that gradually decreases from one end (one end adjacent to the terminal) to the other end. Alternatively, the land 230 may have a truncated pyramidal shape (frustum of pyramid) having a polygonal cross section that gradually decreases from one end (one end adjacent to the terminal) to the other end.

Since the cross-sectional area of the land 230 gradually decreases from one end (one end adjacent to the terminal) to the other end as described above, the inclined guide portion 270 may be provided on the sidewall of the land 230. In particular, the round portion 280 may be provided at the boundary between the land surface 230a and the inclined guide portion 270.

In addition, in the embodiment of the present disclosure illustrated and described above, the example in which the plurality of lands 230 provided on the separator 200 is disposed in the same line in the first direction D1 is described. However, according to another embodiment of the present disclosure, the plurality of lands may be disposed in different lines in the first direction.

Figure 9:
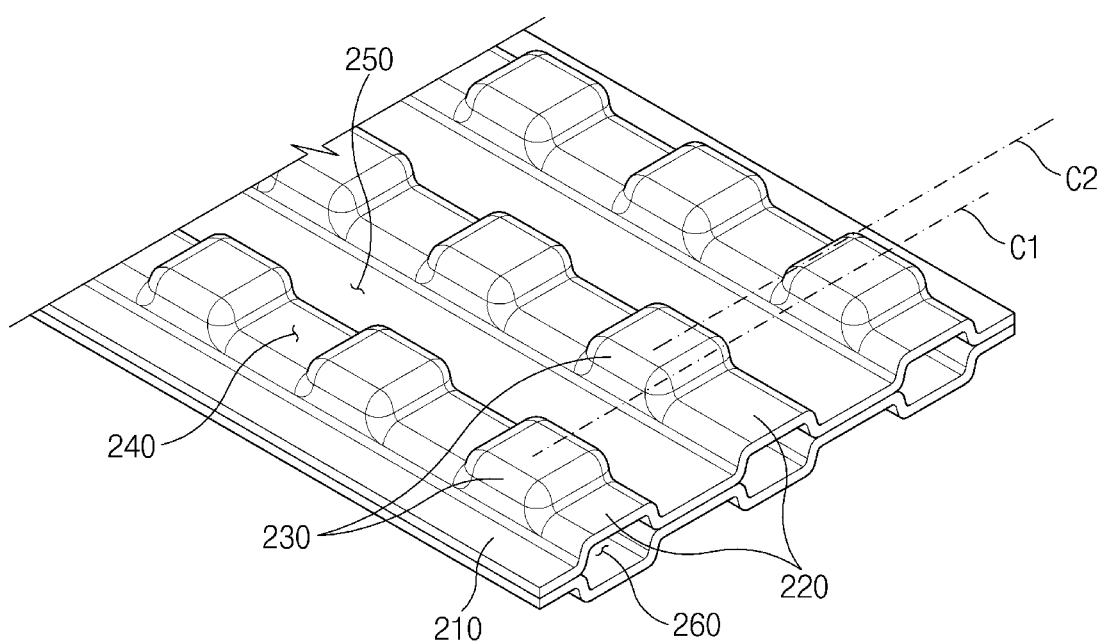

Referring to FIG. 9, according to the exemplary embodiment of the present disclosure, the plurality of lands 230 provided on the separator 200 may be disposed in different lines in the first direction D1.

For example, at least any one of the plurality of lands 230 provided on the separator 200 may be disposed in the first direction D1 in a first line C1, and another one of the plurality of lands 230 provided on the separator 200 may be disposed in the first direction D1 in a second line C2 spaced apart from the first line C1. Therefore, the lands 230 and the first channels 240 may be alternately disposed in the first direction D1 with the second channel 250 interposed therebetween.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A separator for a fuel cell, which is stacked on a reaction layer comprising a membrane electrode assembly (MEA) and a gas diffusion layer (GDL) that is stacked on the MEA, the separator comprising:
    a plate body stacked on the GDL;
    stepped portions, on which a reactant gas flows in a first direction, disposed on a first surface of the plate body, the first surface facing the GDL and the stepped portions each extending in a second direction that intersects the first direction in which the reactant gas flows;
    lands disposed on the stepped portions and spaced apart from one another in the second direction, the lands being in contact with the GDL;
    first channels, along which the reactant gas flows, extending through between the GDL and the stepped portions so as to be disposed between adjacent lands among the lands; and
    second channels, along which the reactant gas flows, extending through between the plate body and the GDL so as to communicate with the first channels,
    wherein, on one of the second channels, the first surface of the plate body includes a first portion between adjacent stepped portions in the first direction among the stepped portions on one of the first channels and a second portion between adjacent lands in the first direction among the lands,
    the first portion and the second portion are disposed on the same level as each other in a third direction that intersects the first and second directions, and
    wherein each of the lands having a circular cross-sectional shape and a truncated conical shape gradually decreasing from one end to the other end,
    wherein the separator comprising an inclined guide portion disposed on each of the lands, the inclined guide portion configured to guide the reactant gas toward the GDL, and a round portion disposed at a boundary between the inclined guide portion and a land surface of each of the lands, the land surface being in contact with the GDL.

2. The separator of claim 1, wherein the second channels continuously extend in the second direction.

3. The separator of claim 1, wherein the stepped portions and the second channels are disposed alternately in the first direction.

4. The separator of claim 3, wherein the lands are aligned along the same line in the first direction.

5. The separator of claim 3, wherein the lands are alternately aligned along the first direction in a zig zag shape.

6. The separator of claim 3, wherein the lands are aligned in the form of a lattice.

7. The separator of claim 1, wherein the first direction and the second direction are orthogonal to each other.

8. The separator of claim 1, wherein the stepped portions are disposed on the first surface of the plate body, each of the stepped portions configured as a relief at a portion of the plate body.

9. The separator of claim 8, comprising cooling channels, through which a coolant flows, disposed on a second surface of the plate body.

10. The separator of claim 9, wherein the cooling channels extend along an internal space of the stepped portions.

11. The separator of claim 10, wherein, when the plate body is provided in plural, at least two plate bodies, among the plurality of plate bodies, are disposed to be adjacent with each other and the cooling channels on the at least two plate bodies, respectively, communicate with each other as a common cooling channel.

12. The separator of claim 1, wherein each of the lands is disposed on one surface of each of the stepped portions as a relief, the one surface facing the GDL, at a portion of the plate body.

13. A fuel cell stack comprising:
a separator, which is stacked on a reaction layer comprising a membrane electrode assembly (MEA) and a gas diffusion layer (GDL) stacked on the MEA; the separator comprising:
a plate body stacked on the GDL;
stepped portions, on which a reactant gas flows in a first direction, disposed on a surface of the plate body, the surface facing the GDL and the stepped portions each extending in a second direction that intersects the first direction in which the reactant gas flows;
lands disposed on the stepped portions and spaced apart from one another in the second direction, the lands being in contact with the GDL;
first channels, along which the reactant gas flows, extending through between the GDL and the stepped portions so as to be disposed between adjacent lands among the lands; and
second channels, along which the reactant gas flows, extending through between the plate body and the GDL so as to communicate with the first channels,
wherein, on one of the second channels, the surface of the plate body includes a first portion between adjacent stepped portions in the first direction among the stepped portions on one of the first channels and a second portion between adjacent lands in the first direction among the lands,
the first portion and the second portion are disposed on the same level as each other in a third direction that intersects the first and second directions, and
wherein each of the lands having a circular cross-sectional shape and a truncated conical shape gradually decreasing from one end to the other end,
wherein the separator comprising an inclined guide portion disposed on each of the lands, the inclined guide portion configured to guide the reactant gas toward the GDL, and a round portion disposed at a boundary between the inclined guide portion and a land surface of each of the lands, the land surface being in contact with the GDL.

* * * * *